United States Patent [19]
Long

[11] Patent Number: 5,315,890
[45] Date of Patent: May 31, 1994

[54] DEVICE FOR GUIDING A TRANSLATION MOVEMENT

[75] Inventor: Michael Long, Rochester, N.Y.

[73] Assignee: Eastman Kodak Company, Rochester, N.Y.

[21] Appl. No.: 924,014

[22] PCT Filed: Mar. 11, 1991

[86] PCT No.: PCT/FR91/00193
§ 371 Date: Sep. 21, 1992
§ 102(e) Date: Sep. 21, 1992

[87] PCT Pub. No.: WO91/14885
PCT Pub. Date: Oct. 3, 1991

[30] Foreign Application Priority Data
Mar. 19, 1990 [FR] France .................. 90 03699

[51] Int. Cl.$^5$ .................. F16H 21/44; F16F 1/18
[52] U.S. Cl. .................. 74/110; 267/25; 267/47; 267/158; 267/160
[58] Field of Search .................. 74/110; 248/610, 611, 248/619; 267/158, 160, 163, 165, 25, 47

[56] References Cited

U.S. PATENT DOCUMENTS

| | | | |
|---|---|---|---|
| 2,793,028 | 5/1957 | Wheeler | 267/160 |
| 3,063,670 | 11/1962 | Young | 248/358 |
| 3,102,721 | 9/1963 | Linville | 267/1 |
| 3,295,803 | 1/1967 | Webb | 248/178 |
| 3,465,997 | 9/1969 | Piske | 248/350 |
| 3,628,781 | 12/1971 | Grib | 267/160 X |
| 3,743,268 | 7/1973 | Helland et al. | 267/160 |
| 4,261,211 | 4/1981 | Haberland | 267/160 |
| 4,322,063 | 3/1982 | Fischbeck et al. | 267/160 |
| 4,550,619 | 11/1985 | Volk, Jr. et al. | 73/862.62 |

FOREIGN PATENT DOCUMENTS

| | | |
|---|---|---|
| 0006088A3 | 12/1979 | European Pat. Off. . |
| 345042 | 8/1978 | Fed. Rep. of Germany . |
| 856345 | 12/1960 | United Kingdom . |

*Primary Examiner*—Allan D. Herrmann
*Attorney, Agent, or Firm*—Charles E. Snee, III

[57] ABSTRACT

The device prevents any relative translation movement in a first plane between two members moving one with regard to the other in a second plane substantially perpendicular to the first plane. Two linkages $P_1 P_4$ and $P_2 P_3$ are flexibly connected at their middle parts by members F1,F6 and a reinforced part 7. The two linkages have one of their ends connected to the first member by a fixed pivot point $P_1$ and a movable pivot point $P_3$, the other end of the two linkages being connected to the second member by a fixed pivot point $P_2$ and a movable pivot point $P_4$, the fixed pivot points and the movable pivot points being comprised of flexible portions, $F_1$ to $F_4$, 8 and 9 of the linkages.

3 Claims, 6 Drawing Sheets

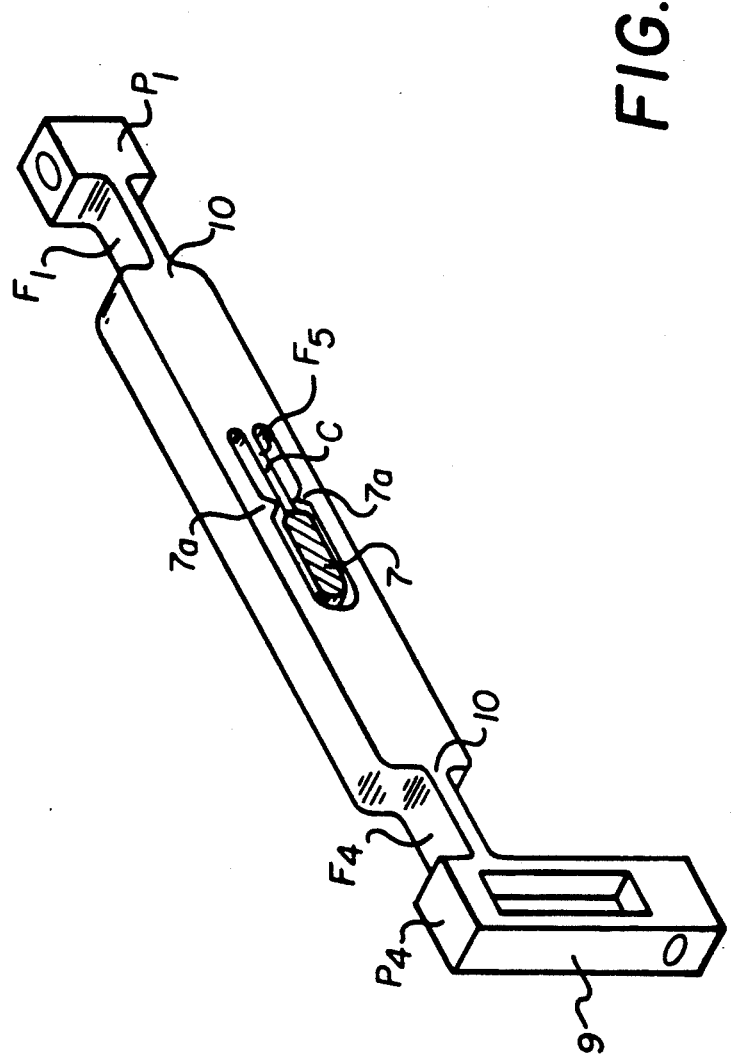

DEVICE FOR GUIDING A TRANSLATION MOVEMENT

FIELD OF THE INVENTION

The invention relates to a device which makes it possible to prevent any relative translation movement in a first plane between two members movable one in relation to the other in a second plane substantially perpendicular to the first.

BACKGROUND OF THE INVENTION

In the field of web products, when it is necessary to carry out an operation according to a determined pitch, such as a perforating, punching, stamping or stitching operation, it is sometimes necessary to have great precision in positioning the tool carrying out the desired operation.

Thus, in the patent application filed on 17 Sep. 1992 by the applicant and Jacques F. Gaudillat, Ser. No. 7/927,502, entitled "Process and Device for Driving a Surface in a Reciprocating Motion in a Given Plane", a description is given of a device for carrying out an operation, according to a given pitch, on a web movable uniformly and continuously. The device comprises a first block fitted with a tool describing, in an reciprocating manner, a short portion of an arc of a circle around a stationary horizontal axis parallel to the movement axis of the web, in order to be able to make the tool cooperate periodically with a member complementary to the tool. The complementary member is provided on a second block, the first block being connected to the second block along the stationary axis. The two blocks are fixed and suspended in this way to a stationary frame and are driven parallel to the movement plane of the web by a reciprocating movement of greater magnitude than the movement of the first block around the stationary axis and of identical period.

For this type of device, particularly when applied to perforating, it is essential that there is no translation movement, in the movement plane of the web, of the blocks in relation to each other.

In the previous technique, it is common to make use of mechanisms of the "SCOTT-RUSSEL" type, which will be described in greater detail in the description which follows and which include a number of joints, pivots or slides. These mechanisms undergo fairly rapid wear, which causes increasing inaccuracies in the positioning of the tool. Furthermore, it is difficult to use such mechanisms when the second plane (i.e, the short portion of an arc of a circle) is not exactly perpendicular to the first plane (i.e. the plane of the web). Such a mechanism is described, for example, in U.S. Pat. No. 3,102,721.

SUMMARY OF THE INVENTION

Consequently, one of the objects of this invention is to supply a device which prevents any relative translation movement in a first plane between two members which can move in relation to each other in a second plane substantially perpendicular to the first and which do not have the drawbacks of the devices of the previous technique.

Another object of this invention is to supply a device offering the advantage of being in a compact form.

Other objects will appear in the course of the detailed description which follows.

The objects of this invention are achieved by producing a device which makes it possible to prevent any relative translation movement in a first plane between two members movable in relation to each other in a second plane substantially perpendicular to the first. The device comprises two linkages ($P_1P_4$ and $P_2P_3$) which are connected to each other at their middle point by a pivot point C, the two linkages having one of their ends coupled to the first member at a pivot point $P_1$, respectively, at a pivoting slider point $P_3$, the other end of the two linkages being coupled to the second member at a pivot point $P_2$, respectively, at a pivoting slider point $P_4$. The two linkages are arranged so as to give $P_1C = P_2C = P_3C = P_4C$, the device being characterized in that the pivot points and pivoting slider points are composed of flexible portions of the two linkages.

BRIEF DESCRIPTION OF THE DRAWINGS

The invention will be described in detail with reference to the annexed drawing plates, in which:

FIG. 4B shows a 3D sectional view along line 4B—4B of FIG. 3.

DETAILED DESCRIPTION OF THE PREFERRED EMBODIMENTS

According to this invention, the device is derived from a mechanism known as the "SCOTT-RUSSEL mechanism". This SCOTT-RUSSEL mechanism corresponds to the parts in continuous lines in FIG. 1. It takes the form overall of a Y composed of two linkages, $P_1CP_4$ and $P_2C$. One end of the linkage $P_2C$ is connected to a pivot point C at the middle of the linkage $P_1CP_4$. Points $P_1$ and $P_2$ are pivot points; $P_4$ is a pivoting slider point. The arrangement of the linkages gives the relationship $P_1C = P_2C = P_4C$. This arrangement forces the point $P_1$ to move along a straight line in relation to the point $P_2$ perpendicular to the plane formed by $P_2$ and $P_4$.

Thus, when moving a surface parallel to the plane formed by $P_2P_4$ in the direction indicated by the arrow A, it is necessary simply to position two such mechanisms side by side. Such an arrangement involves the drawback of being cumbersome and of multiplying the number of pivots and pivoting sliders, which are subject to problems of rapid wear and, therefore, of fairly high inaccuracy in guiding the movement of the surface.

Figure 1:
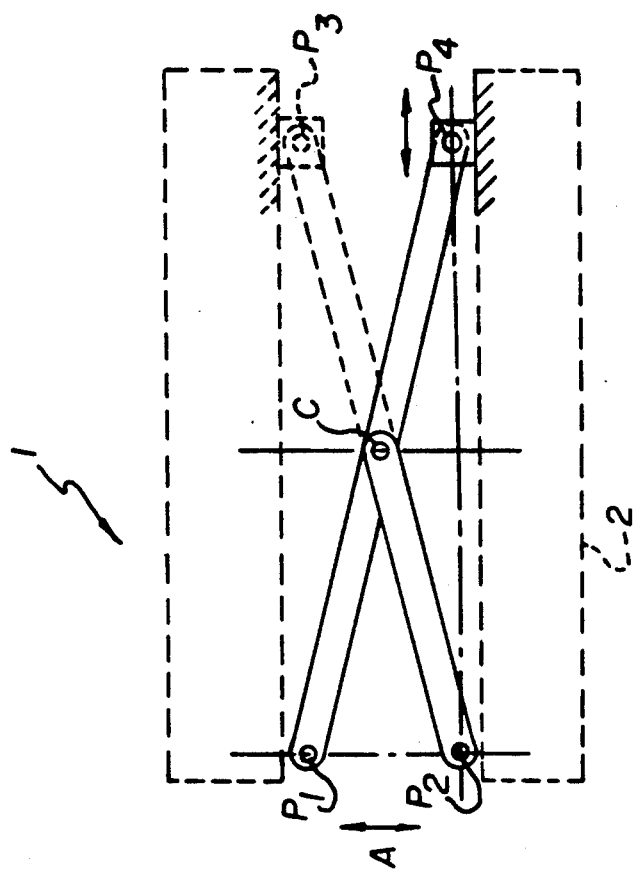
FIG. 1 represents diagrammatically a prior art mechanism of the SCOTT-RUSSEL mechanism type.

Another solution, as represented in the broken lines in FIG. 1 consists of extending the linkage of $P_1C$ into $P_1P_3$ so as to have two linkages, $P_1P_4$ and $P_2P_3$, which are connected to each other at their middle point by a pivot point C. The blocks represented by broken lines (1) and (2) represent two members between which there should be no relative translation movement parallel to the plane formed by $P_2$ and $P_4$ when these two members move in relation to one another in a second perpendicular plane, to the plane formed by $P_2$ and $P_4$. One of the ends of each of the two linkages is coupled to the first member (1) at a pivot point $P_1$, respectively, at a pivoting slider point $P_3$, the other end of the two linkages being coupled to the second member (2) at a pivot point $P_2$, respectively, at a pivoting slider point $P_4$. The two linkages are arranged in such a way as to give $P_1C=P_2C=P_3C=P_4C$. Such a device is less cumbersome in comparison with the device consisting of two mechanisms arranged side by side, as referred to above; however, it involves the same drawbacks relating to the presence of the conventional pivots and pivoting slides.

Furthermore, in the case of the previously mentioned patent application filed by the applicant and Jacques F. Gaudillat, the block supporting the tool describes a short portion of an arc of a circle around a stationary horizontal axis. The movement obtained is not, therefore, in a plane exactly perpendicular to the plane of the web. For this reason, it is not possible to use the conventional pivots and pivoting slides as are described above. In accordance with the present invention, as is represented in FIGS. 2A–4B, the joints shown as points $P_1$, $P_2$, $P_3$, $P_4$ and C in FIG. 1 are replaced by flexible members $F_1$–$F_6$. Each of the linkages $P_1P_4$ and $P_2P_3$ comprises, at its ends, an area of smaller thickness $F_1$ to $F_4$ thus making it possible to provide each linkage with a certain flexibility, performing the function of a pivot as desired at these different points. The two linkages also comprise, at their middle parts, respective areas of smaller thickness $F_5, F_6$ which are substantially identical to the end areas of the linkages, thereby providing the function of pivot at point C. According to one embodiment, the two linkages $P_1P_4$ and $P_2P_3$ form one single piece, a reinforced part (7) joining flexible members $F_5, F_6$ and being the part common to the two linkages.

Figure 2A:
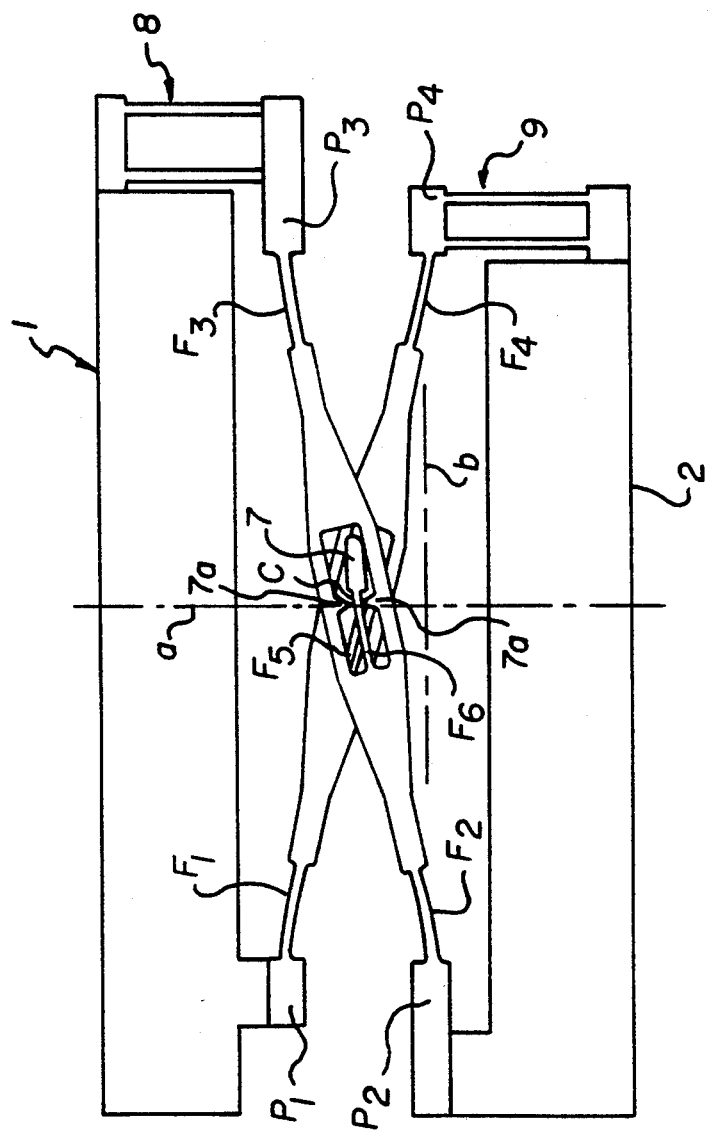
FIG. 2A represents diagrammatically the device according to this invention in the "open" position.
Figure 3:
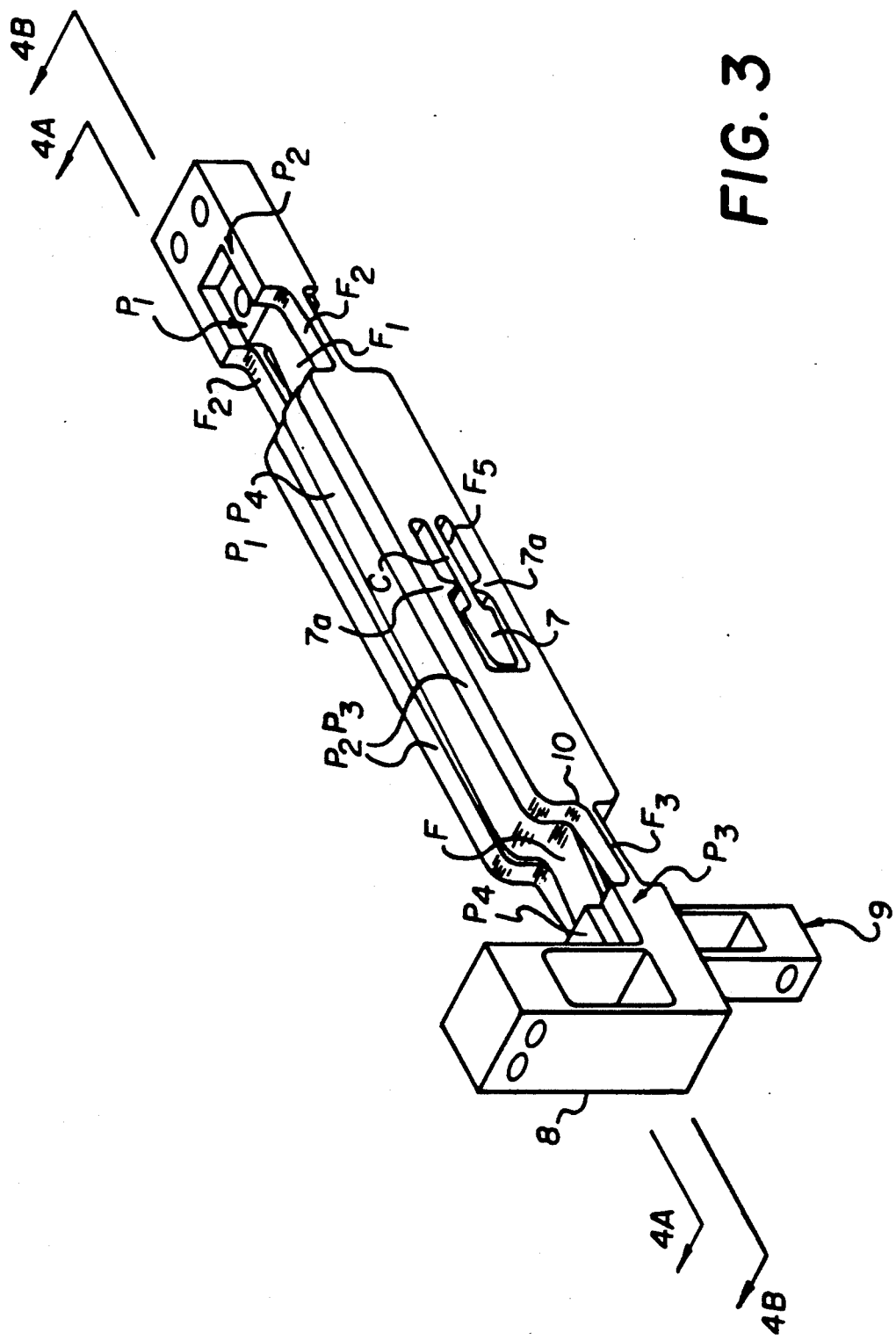
FIG. 3 represents a 3D view of the device according to this invention.
Figure 4A:
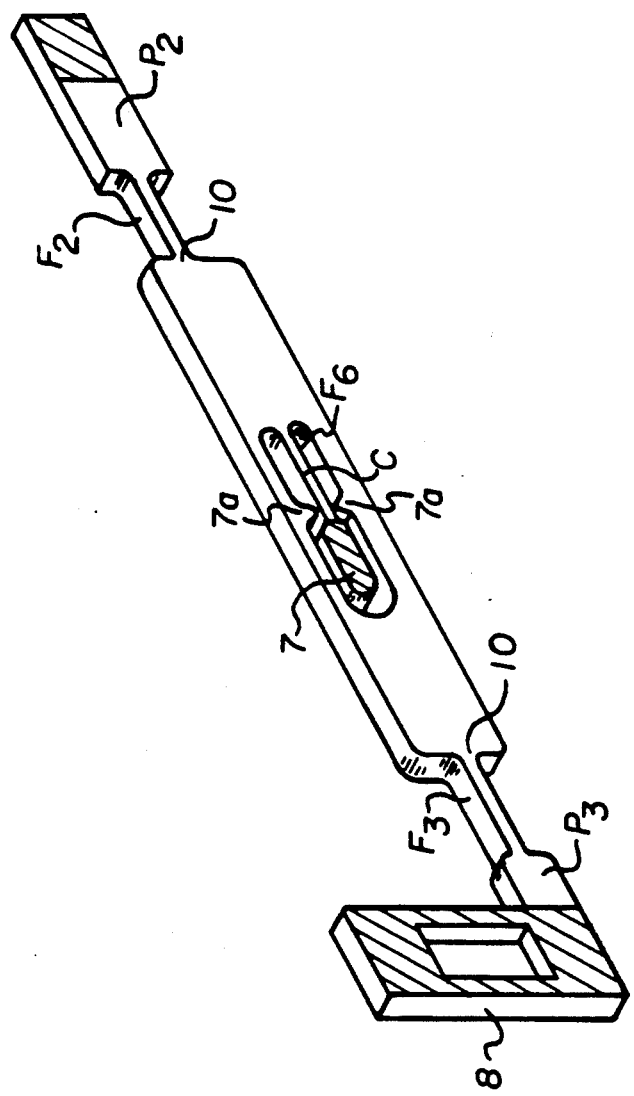
FIG. 4A shows a 3D sectional view along line 4A—4A of FIG. 3.

As shown in FIGS. 3, 4A and 4B, linkage $P_2P_3$ is formed by two spaced, parallel portions between which is nestled linkage $P_1P_4$. Flexible members $F_5, F_6$ are formed by central cutouts passing through both of the linkages, the ends of flexible members $F_5, F_6$ being joined by the reinforced part (7). As a result, linkages $P_2P_3$ and $P_1P_4$ pivot about points C along the lengths of flexible members $F_5, F_6$, as shown in FIG. 2A. Functions similar to pivoting slides are provided at points $P_3$ and $P_4$ by means of flexible members (8) and (9) which are arranged on the members (1) and (2) so as to allow substantial translation movement of points $P_3$ and $P_4$. Thus, members 1 and 2 in FIG. 2A can move in the direction of a plane (a) perpendicular to a plane (b) through points $P_2$ and $P_4$, undergoing significant translation in a direction parallel to plane (b).

In this type of system, the point C (in fact acting as the joint of the point C in FIG. 1) is situated, in relation to the reinforced part (7), at a distance equal to approximately ⅓ of the length of the flexible portions $F_1$–$F_6$. As shown in FIGS. 2A to 4B, stops (7a) are provided on either side of flexible portions $F_5, F_6$ to limit their deformation.

With members (8) and (9) arranged as represented in FIG. 2A, points $P_3$ and $P_4$ in fact describe a short portion of an arc of a circle which can, over a short distance, be regarded as a translation movement. These members, (8) and (9), can be eliminated when the slide movement of the points $P_3$ and $P_4$ is of very low magnitude.

According to such a device, the distortions undergone by the flexible parts $F_1$–$F_6$ must be equal, so as to maintain the geometric ratios required for the desired movement of the member (1), namely $P_1C=P_2C=P_3C=P_4C$. According to this invention, the device is constructed of spring steel and, preferably, a special heat-treated steel such as MARAGING steel. According to one embodiment, the length of the flexible parts $F_1$–$F_6$ is in the order of 11.5 mm for a distance $P_1P_3=P_2P_4=40.4$ mm.

The thickness of the flexible parts $F_1$–$F_6$ is in the order of 1 mm.

Figure 2B:
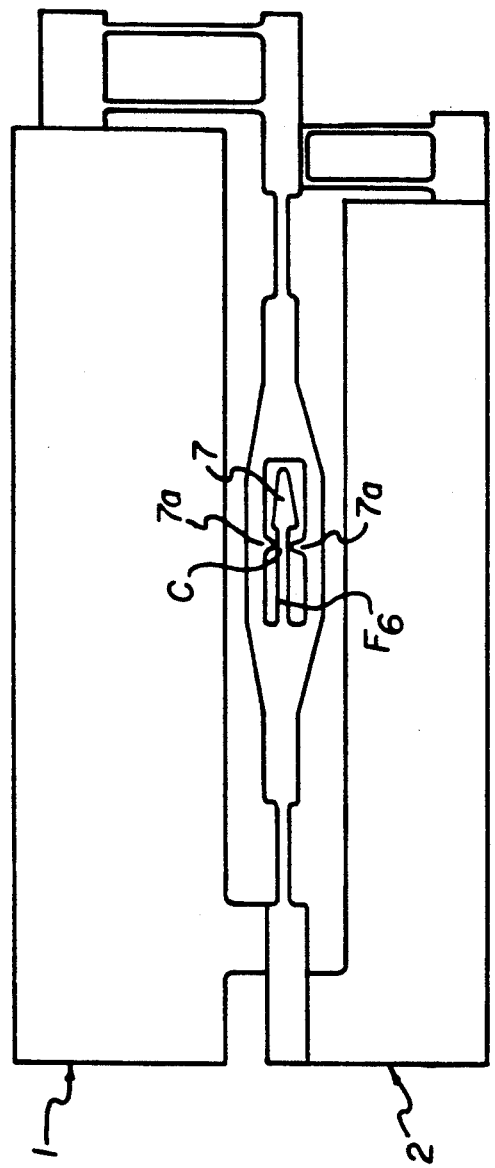
FIG. 2B represents diagrammatically the device according to this invention in the rest position.

FIG. 2A shows the device in an exaggerated manner in the "open" position, whilst FIG. 2B shows the same device in the rest position. According to one embodiment, the maximum magnitude of the slide movement of points $P_3$ and $P_4$ is in the order of $\pm 15$ μm for a vertical movement of points $P_1$ and $P_3$ in the order of $\pm 2$ mm.

FIGS. 3, 4A and 4B show 3D views of the device according to this invention, and highlight the compact structure of such a device. The parts forming the device are identified in the same way as in the preceding figures. Preferably, the connection (10) from the flexible members $F_1$–$F_6$ to the thicker parts of the device is such that it does not form a right angle but, rather, a suitable curve like a fillet radius.

I claim:

1. A device for constraining relative movement of first and second members (1, 2), comprising:
    a first link ($P_1$–$P_4$) having first and second ends;
    a second link ($P_2$–$P_3$) having first and second ends;
    a first flexible pivot portion ($F_1$) extended between the first end of the first link and the first member to permit rotational movement of the first link in a first direction between the members but restrict movement of the first link in a second direction orthogonal to the axis of the rotation of the first link;
    a second flexible pivot portion ($F_2$) extended between the first end of the second link and the second member to permit rotational movement of the second link in the first direction between the members but restrict movement of the second link in the second direction;
    a third flexible pivot portion ($F_3$) extended from the second end of the second link to permit rotational movement of the second link in the first direction;
    a fourth flexible pivot portion ($F_4$) extended from the second end of the first link to permit rotational movement of the first link in the first direction;
    a fifth flexible pivot portion ($F_5$) extended from a middle part of the first link;
    a sixth flexible pivot portion ($F_6$) extended from a middle part of the second link;
    a member (7) joining the fifth and sixth flexible pivot portions to permit rotation in the first direction of the first link relative to the second link about a point (C) along the lengths of the fifth and sixth pivot portions;
    a seventh flexible pivot portion (8) extended from the third flexible pivot portion to the first member to permit movement of the second link in the second direction but prohibit movement in the first direction; and
    an eighth flexible pivot portion (9) extended from the fourth flexible pivot portion to the second member to permit movement of the first link in the second direction but prohibit movement in the first direction.

2. A device according to claim 1 further comprising means (7a) engageable by the fifth and sixth flexible pivot portions for limiting the deformation of the fifth and sixth flexible pivot portions relative to their respective links.

3. A device according to claim 1 wherein the distances $P_1C$, $P_2C$, $P_3C$ and $P_4C$ are equal.

* * * * *